UNITED STATES PATENT OFFICE.

LEWIS A. COLEMAN, OF NORFOLK, VIRGINIA, ASSIGNOR OF ONE-THIRD TO J. EMMET SEBRELL AND ONE-THIRD TO HARVEY ABRAMES, BOTH OF NORFOLK, VIRGINIA.

WATERPROOFING COMPOSITION.

944,233. Specification of Letters Patent. Patented Dec. 21, 1909.

No Drawing. Application filed February 23, 1909. Serial No. 479,646.

*To all whom it may concern:*

Be it known that I, LEWIS A. COLEMAN, a citizen of the United States, residing at Norfolk, in the county of Norfolk and State of Virginia, have invented new and useful Improvements in Waterproofing Composition, of which the following is a specification.

This invention relates to a new and improved waterproofing filler composition especially prepared for application to concrete and masonry walls or structures, the purpose being to render the walls or structures to which the composition is applied, proof against the entrance of water or moisture. The composition is also adapted for use in connection with wooden structures, especially those buried in the ground, or submerged under water, such as columns, telegraph-poles, fence-posts and piles, although the method of applying the composition to concrete and masonry structures differs somewhat from the method employed when applying the same to wooden structures. In the former, the composition is applied by means of an ordinary paint-brush, whereas in the latter case the composition is applied by submerging or immersing the structures therein.

The object of the invention is to provide a comparatively inexpensive waterproofing filler composition in free flowing liquid form, that may be readily compounded and easily applied, and the chief characteristics of which is, that when applied, to the surface to be rendered water or moisture-proof, it will penetrate, for a considerable depth, the said surface, effectually entering and closing all the crevices or interstices thereof.

Other characteristics of the composition are, that it is practically colorless, and will not therefore, discolor or alter the general appearance of the surface to which it is applied; and is absolutely without glaze or gloss, which is a desideratum of no small importance in compositions of this character.

In order to enable others to understand, prepare and apply my improved composition, I will now proceed to describe the same in detail, giving what I have discovered to be the proper proportions for one gallon of the mixture, it being understood of course that larger or smaller quantities are to be prepared in like proportions.

The formula is as follows: One pint of gum rubber cement (a solution of gum rubber and gasolene). One-half pint spirits of turpentine. Six and one-half pints of gasolene.

The three ingredients above named and in the proportions stated, are thoroughly mixed either by agitation, stirring or otherwise until the particles are fully broken up, the resulting mixture consisting of innumerable globules of the gum-rubber cement and turpentine, the whole being in suspension in the gasolene which latter acts as a vehicle.

It has been found in actual practice, that when the fluid filler is applied to a wall surface, as by a brush, the small globules that are held in suspension in the gasolene will readily and quickly enter or penetrate, the crevices or interstices of the wall and effectually close the same, rendering, not only the surface of the wall water and moisture proof, but the wall structure itself is rendered waterproof to a considerable depth.

Ordinarily one or two coats of the composition are amply sufficient to render a concrete or brick wall absolutely waterproof and as the composition is practically colorless and has no gloss or glaze producing properties, the general appearance of the surface will not be altered in the least.

When it is desired to waterproof wooden posts, columns, or other timbers, these are submerged or immersed in the composition and allowed to remain therein for a sufficient length of time to enable the same to enter and fill the pores thereof, the length of time depending somewhat upon the character and grain of the timber.

It will be understood that my improved waterproof composition is not a paint but a filler and differs from a paint in that the latter when applied to a wall or surface simply gives a coating thereto, whereas my improved filler penetrates to a considerable distance the wall or structure to which it is applied, effectually closing the pores, crevices or interstices making the surface absolutely water or moisture proof, the surface of the wall or structure to which the composition is applied not being otherwise affected in the slightest degree.

What I claim is,—

1. A free flowing liquid waterproofing filler, comprising a mixture of gum rubber cement, spirits of turpentine and gasolene, in substantially the following proportions— 12½ parts gum rubber cement, 6¼ parts spirits of turpentine, and 81¼ parts gasolene.

2. The herein described liquid waterproofing filler composition, comprising a mixture of 12½ parts of gum rubber cement, 6¼ parts spirits of turpentine, and 81¼ parts gasolene, the physical characteristics of which are a free flowing practically colorless fluid.

In testimony whereof I have hereunto set my hand in presence of two subscribing witnesses.

LEWIS A. COLEMAN.

Witnesses:
 R. W. PEATROSS,
 JANIE M. CURRIE.